US008177161B2

(12) United States Patent
Morehead et al.

(10) Patent No.: US 8,177,161 B2
(45) Date of Patent: May 15, 2012

(54) RETRACTING AIR CUSHIONED LANDING SYSTEM FOR AIR VEHICLES

(75) Inventors: John P. Morehead, Santa Clarita, CA (US); Douglas H. Greiner, Stevenson Ranch, CA (US); Renee Pasman, Palmdale, CA (US); Robert R. Boyd, Valencia, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/158,350

(22) Filed: Jun. 10, 2011

(65) Prior Publication Data
US 2012/0043416 A1    Feb. 23, 2012

Related U.S. Application Data

(62) Division of application No. 12/168,393, filed on Jul. 7, 2008, now Pat. No. 8,016,229.

(51) Int. Cl.
*B64C 21/00*    (2006.01)
(52) U.S. Cl. ...................... 244/100 A; 244/30
(58) Field of Classification Search .............. 244/138 R, 244/139, 140, 100 A, 100 R, 125, 126, 130; 180/127, 121, 129
See application file for complete search history.

(56) References Cited

U.S. PATENT DOCUMENTS

| 3,869,103 A | 3/1975 | Nelson et al. |
| 4,019,698 A | 4/1977 | Earl |
| 4,131,175 A | 12/1978 | Wheeler |
| 5,909,857 A | 6/1999 | Filimonov |
| 7,040,572 B2 | 5/2006 | Munk |

FOREIGN PATENT DOCUMENTS

| FR | 1 457 774 | | 1/1966 |
| GB | 2074112 A | * | 10/1981 |
| WO | WO 03-047967 | | 6/2003 |

* cited by examiner

*Primary Examiner* — Joshua J Michener
*Assistant Examiner* — Brian M O'Hara
(74) *Attorney, Agent, or Firm* — McDermott Will & Emery LLP

(57) ABSTRACT

An air vehicle includes a bag skirt extendable along a portion of a hull of the air vehicle. The bag skirt is inflatable to provide an air cushion during touchdown and deflatable during flight of the air vehicle. The air vehicle also includes a cover roller adjacent the bag skirt, and a cover portion coupled to the cover roller. The cover roller is operable between exposed position and unexposed positions to expose and hide the bag skirt with the cover portion. The cover roller includes an extensible shaft and a pad securely wrapped around the extensible shaft. The extensible shaft is capable of being rotated along a shaft axis. One end of the extensible shaft is pivotally coupled to the hull by an anchor. A circumference of the cover roller is configured as a function of a distance between the exposed and the unexposed positions.

9 Claims, 5 Drawing Sheets

RETRACTING AIR CUSHIONED LANDING SYSTEM FOR AIR VEHICLES

CROSS-REFERENCES TO RELATED APPLICATIONS

This application is a divisional application of U.S. patent application Ser. No. 12/168,393, filed on Jul. 7, 2008, which is hereby incorporated by reference in its entirety for all purposes.

BACKGROUND

A hybrid air vehicle is a type of air vehicle (may also referred to as an aircraft or an airship) that combines the characteristics of aviation technologies such as heavier-than-air (HTA) aircraft, lighter-than-air (LTA) vehicles, fixed wing aircraft, helicopter, hovercraft and similar others to perform desired functions. Hybrid air vehicles are currently under development that combine the advantages of an aerodynamic shape with the cargo capacity, simplicity, and low operating costs of LTA vehicles. Uses for such vehicles include cargo transport, telecommunications platforms, surveillance, emergency response, advertising platforms, and tourism, among others.

LTA vehicles are typically slow and difficult to maneuver. Yet, it is desirable to develop a hybrid air vehicle capable of take off and landing in a minimum amount of space. Traditional LTA vehicles with an air cushioned landing system (ACLS) have been proposed to reduce the take off and landing space requirement. However, many traditional ACLS systems have fixed configurations during take off and landing and also during the flight. This increases drag and reduces fuel efficiency. More recently, some LTA vehicles include an ACLS system that is operable in dual modes including a take off and landing mode that is suitable for landing and take off, and a flight mode that is suitable for operation during the flight of the vehicle. However, traditional tools and techniques that are used for enabling the dual mode ACLS system to transition between the flight mode and the take off and landing mode are often impractical, inefficient, and prone to frequent failures.

SUMMARY

Applicants recognize that traditional tools and techniques for transitioning between the operating modes of a dual mode ACLS rely on the use of an unreliable engaging and disengaging technology such as a zipper for connecting two elements. Use of engageable (capable of being engaged) and disengageable connection means like the zipper is prone to frequent failures such as wearing out the zipper or fabric due to repeated opening and closing operations, failure of the zipper due to the fabric getting caught in the zipper, separation of the connected elements after zipper is closed, misalignment of the zipper teeth, and other problems. In addition, applicants recognize that implementation of a mechanism to open and close the zipper used in an aerospace environment may be difficult, unreliable, and impractical. Therefore, a need exists to provide improved tools and techniques to be used in an aerospace environment for the efficient and reliable operation of the dual mode ACLS, absent the disadvantages found in the prior techniques discussed above.

In some embodiments, an air vehicle is provided. The air vehicle includes a bag skirt extendable along a portion of a hull of the air vehicle. The bag skirt is inflatable to provide an air cushion during touchdown and deflatable during flight of the air vehicle. The air vehicle also includes a cover roller adjacent the bag skirt, and a cover portion coupled to the cover roller. The cover roller is operable between exposed position and unexposed positions to expose and hide the bag skirt with the cover portion. The cover roller includes an extensible shaft and a pad securely wrapped around the extensible shaft. The extensible shaft is capable of being rotated along a shaft axis. One end of the extensible shaft is pivotally coupled to the hull by an anchor. A circumference of the cover roller is configured as a function of a distance between the exposed and the unexposed positions. The cover portion has a first end secured to the hull and a second end rollable around the cover roller.

In some embodiments, a hybrid air vehicle is disclosed in which covers are provided for a plurality of air cushioned landing pads to reduce drag when airborne. Each pad is inflatable to provide an air cushion during touchdown and deflatable during flight of the air vehicle. The cover includes a first cover portion and a second cover portion. A first cover roller of the first cover portion and a matching second cover roller of the second cover portion abut to cover the corresponding pad. The first cover roller and the second cover roller, which are separate and free from a physical linkage there between, are separable in an eyelid fashion to expose the corresponding pad. A separation gap between the first cover roller and the second cover roller is increased or decreased by pulling or releasing roller straps to cover or expose the corresponding pad.

In other embodiments, a cover includes a first cover portion and a second cover portion. A first cover roller of the first cover portion and a matching second cover roller of the second cover portion abut to cover the corresponding pad. The first cover roller and the second cover roller, which are separate and free from a physical linkage there between, are separable in an eyelid fashion to expose the corresponding pad. A separation gap between the first cover roller and the second cover roller is increased by the roller straps to expose the corresponding pad. Evacuating the air from the air cushioned pad enables the cover portions to retract, thereby closing the cover. Additionally, the ACLS is operable in a combination mode in which the pad is used for distributed support and is also used to provide a vacuum seal between the air vehicle and a ground surface upon touchdown.

In other embodiments, an air vehicle comprises a bag skirt extendable along a portion of a hull of the air vehicle. The bag skirt is inflatable to provide an air cushion during touchdown and deflatable during flight of the air vehicle. A cover roller is adjacent the first bag skirt. A cover portion is coupled to the cover roller. The cover roller is operable between exposed and unexposed positions to expose and hide the bag skirt with the cover roller.

BRIEF DESCRIPTION OF THE FIGURES

Embodiments of the present invention may be better understood, and their numerous objects, features, and advantages made apparent to those skilled in the art by referencing the accompanying drawings. The use of the same reference symbols in different drawings indicates similar or identical items.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings.

The functionality of various mechanical elements, members, or components for forming modules, sub-assemblies and assemblies assembled in accordance with a structure for an apparatus may be implemented using various materials and coupling techniques, depending on the application requirements. Descriptive and directional terms used in the written description such as top, bottom, left, right, and similar others, refer to the drawings themselves as laid out on the paper and not to physical limitations of the disclosure unless specifically noted. The accompanying drawings may not to be drawn to scale and some features of embodiments shown and described herein may be simplified or exaggerated for illustrating the principles, features, and advantages of the disclosure.

The following terminology may be useful in understanding the present disclosure. It is to be understood that the terminology described herein is for the purpose of description and should not be regarded as limiting.

System—One or more interdependent elements, components, modules, or devices that co-operate to perform one or more predefined functions.

Configuration—Describes a set up of elements, components, modules, devices, and/or a system, and refers to a process for setting, defining, or selecting particular properties, parameters, or attributes associated with the elements, components, modules, devices, and/or the system. For example, a pressurized air supply may be configured to operate in one of three modes—a blower mode, a suction mode, and a combination mode.

A hybrid air vehicle equipped with an air cushioned landing system (ACLS) is described with reference to FIGS. 1, 2, 3 and 4. The hybrid air vehicle equipped with the ACLS offers considerable capability in terms of lifting capacity, operational flexibility, and cost effectiveness. Such an air vehicle has the ability to operate from unimproved landing sites on both land and water. Along with the advantage of an extended operating range and landing location, the hybrid air vehicle also has handling characteristics more similar to a hovercraft than a traditional aircraft. Additional detail of an air cushioned landing pad (ACLP) included in the ACLS is described with reference to FIGS. 5A, 5B, 5C, and 5D.

Figure 1:
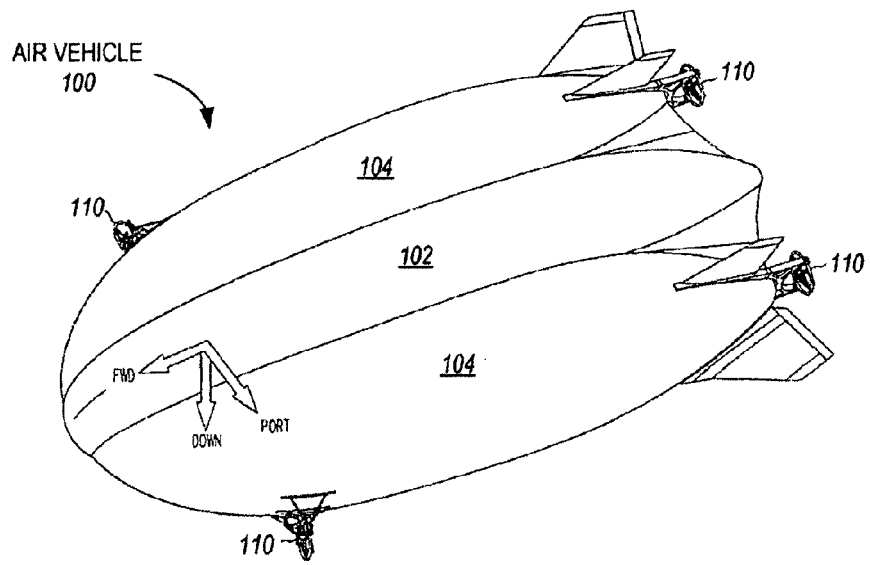
FIG. 1 is a perspective view of an embodiment of a top side of a hybrid air vehicle.

FIG. 1 is a perspective view of an embodiment of the top side of hybrid air vehicle 100 including a plurality of propulsion elements 110 disposed on port, starboard, and aft positions of vehicle 100. In the embodiment shown, air vehicle 100 has a center gas-filled hull 102 joined longitudinally along a portion of gasfilled side hulls 104. The use of the side hulls 104 improves the stability of the air vehicle 100 on the ground as well as during flight. The propulsion elements 110 are operable to provide controlled motion in different directions. The aerodynamic shape of hulls 102, 104 of air vehicle 100 generates lift. Additional lift is provided by a buoyant gas, such as helium, contained in hulls 102, 104. It is understood that the air vehicle 100 may be configured in multiple hull configurations, e.g., with or without the side hulls 104, with two center hulls, or with one center hull 102. Similarly, it is understood that the air vehicle 100 may be configured to have less or more number of propulsion elements 110.

The outer surface of air vehicle 100 may be fabricated of a non-rigid sheet material, including composite and/or laminated fabric material. Hulls 102, 104 are typically pressurized, thereby eliminating the need for internal structure or bracing. Such a design provides a vehicle 100 with resilient external surfaces that is low cost and low weight. The relatively low height to length profile of hulls 102, 104 provide improved stability and ground handling compared to conventional lighter-than-air vehicles of equal gas volume.

Figure 2:
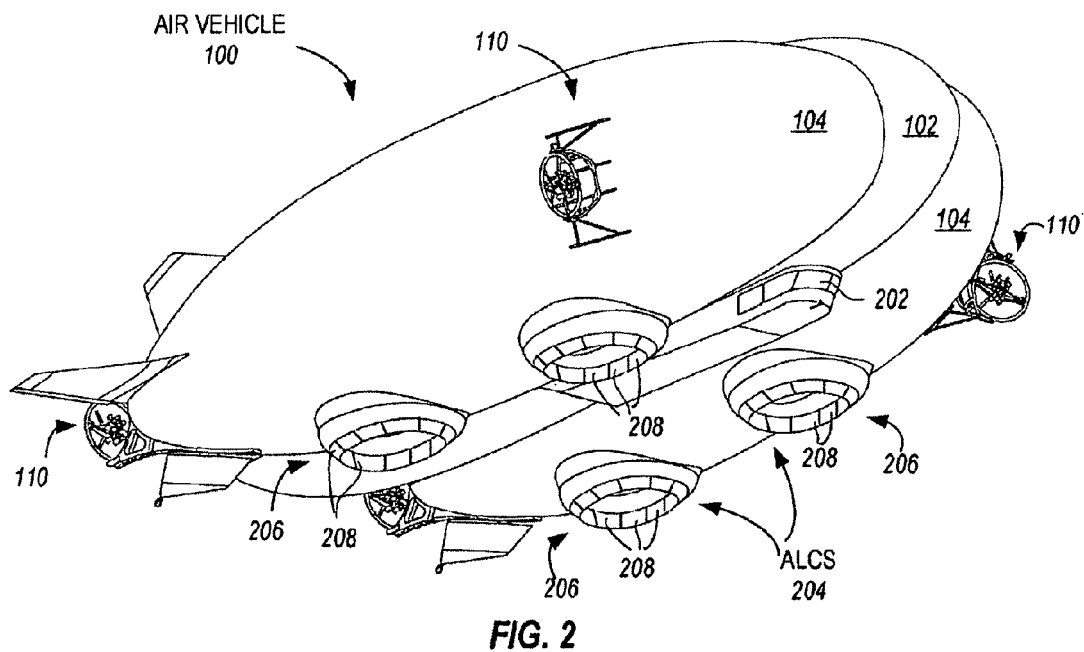
FIG. 2 is a perspective view of the embodiment of a lower side of a hybrid air vehicle described with reference to FIG. 1.
Figure 3:
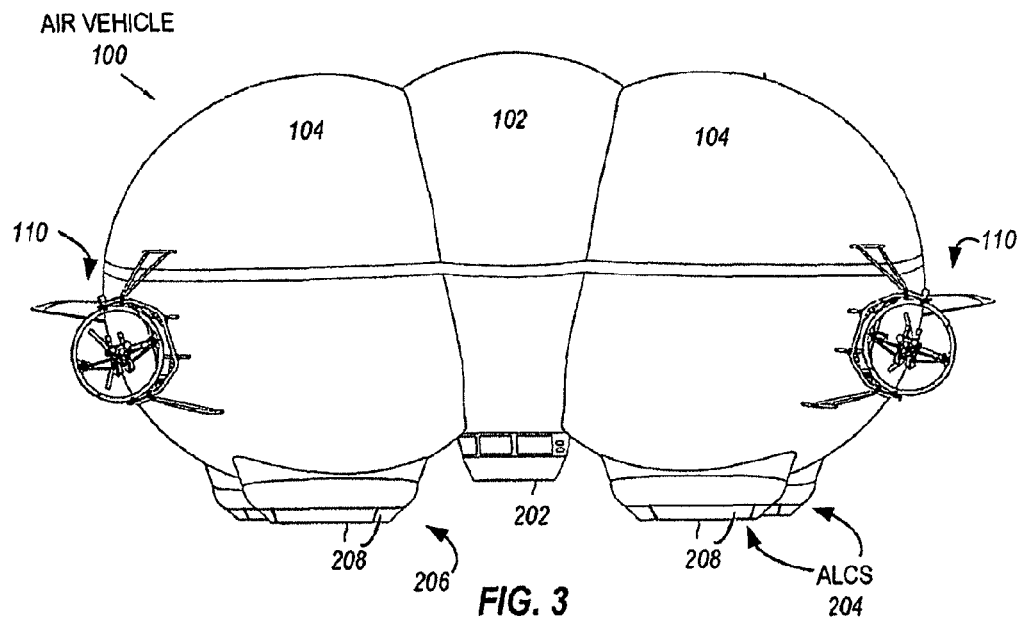
FIG. 3 is a front view of an embodiment of a hybrid air vehicle described with reference to FIGS. 1 and 2.

FIG. 2 is a perspective view of the lower side of a hybrid air vehicle 100 including the plurality of propulsion elements 110 disposed on port and starboard positions. Gondola 202 is attached to center hull 102 in a longitudinal recess formed by side hulls 104 being positioned slightly lower than center hull 102. FIG. 3 shows a front view of air vehicle 100 and the vertical position of center hull 102 relative to side hulls 104. Gondola 202 and/or hulls 102, 104 can be configured to carry passengers, cargo, on-board computers, cameras and other instruments, GPS, sensors, equipment, and other suitable items/systems.

Referring back to FIG. 2, an air cushioned landing system (ACLS) 204, which includes a plurality of air cushioned landing pads 206, may be configured in accordance with a flight mode of the air vehicle 100. The ACLS 204 having the plurality of air cushioned landing pads 206 is shown in a deployed (or exposed) position, e.g., during landing, touchdown, and takeoff of the air vehicle 100. In the depicted embodiment, each one of the plurality of air cushioned landing pads 206 includes a plurality of fingers 208. The plurality of fingers 208 may be separated from one another, thereby allowing them to pass over objects such as tree stumps, rocks, and other terrain. Each one of the plurality of fingers 208 forms an air chamber or air cushion, which may be individually inflated or deflated for improved control. It is understood that a number and shape of the plurality of fingers 208 may vary depending on the application.

Figure 4:
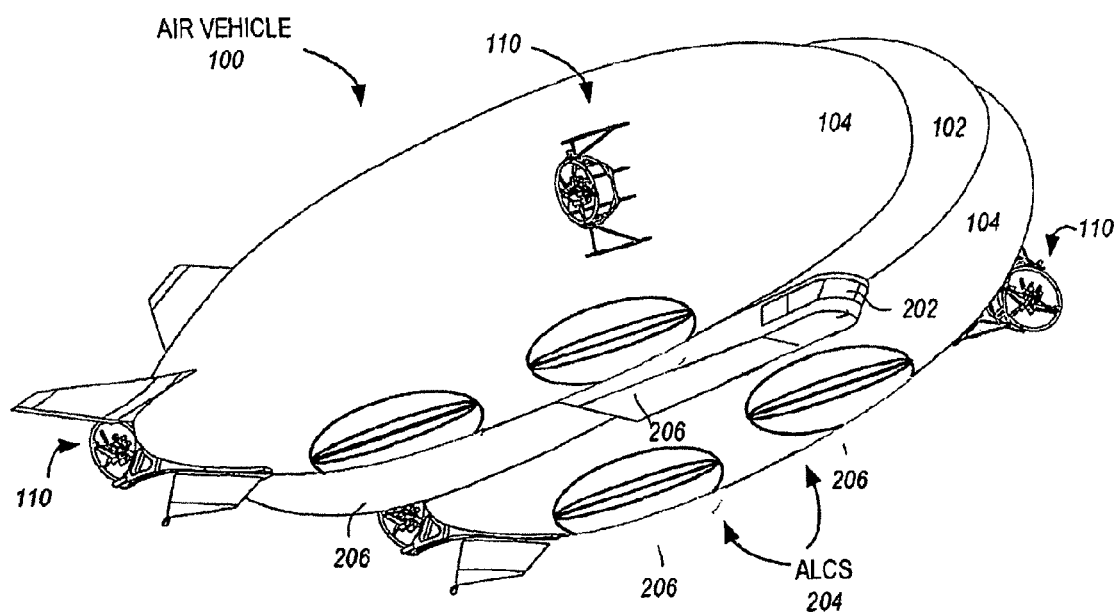
FIG. 4 is a perspective view of an embodiment of a plurality of air cushioned landing pads shown in a covered position during flight of a hybrid air vehicle described with reference to FIGS. 1, 2 and 3.

FIG. 4 is a perspective view of the plurality of air cushioned landing pads 206 shown in a retracted (or covered) position, e.g., during flight of the air vehicle 100, to reduce drag. During flight, the profile of the air cushioned landing pads 206 in a covered position is reduced and made more aerodynamic compared to the profile of the pads in a deployed position, thereby reducing drag on the air vehicle 100. Additional detail of an air cushioned landing pad included in the plurality of air cushioned landing pads 206 is described with reference to FIGS. 5A, 5B, 5C, and 5D.

Referring back to FIGS. 2 and 3, air cushioned landing pads 206 are disposed in a spaced relation, e.g., arranged in an array formation, on the underside of side hulls 104. The depicted embodiment includes two air cushioned landing pads 206 on the bottom of each side hull 104. It is understood that depending on the configuration and dimensions of the air vehicle 100 the number and positions of air cushioned landing pads included in the ACLS 204 may be different. ACLS 204 can be positioned fore and aft of the center of gravity of air vehicle 100 to improve the stability and handling of air vehicle 100 during take off, landing, and touchdown.

The ACLS 204 enables the air vehicle 100 to be lowered to the ground surface in a controlled manner, e.g., by controlling an amount of the air exhausted from the plurality of air cushioned landing pads 206, to achieve a soft landing. Gondola 202 may be positioned to enable cargo to be easily off-loaded from a ramp (not shown). The ACLS 204 further enables air vehicle 100 to takeoff and land in relatively small areas and may be used on landing surfaces that are relatively uneven compared to conventional runways. Furthermore, air vehicle 100 may take-off and land on liquid and solid surfaces. In a particular embodiment, the ACLS 204 may be configured to exhaust air from a selective portion of the air cushioned landing pads 206 to create a vacuum seal on the landing surface upon touchdown, thereby providing a stable platform for loading and unloading without the aid of ground crews and tie-down systems.

Figure 5A:
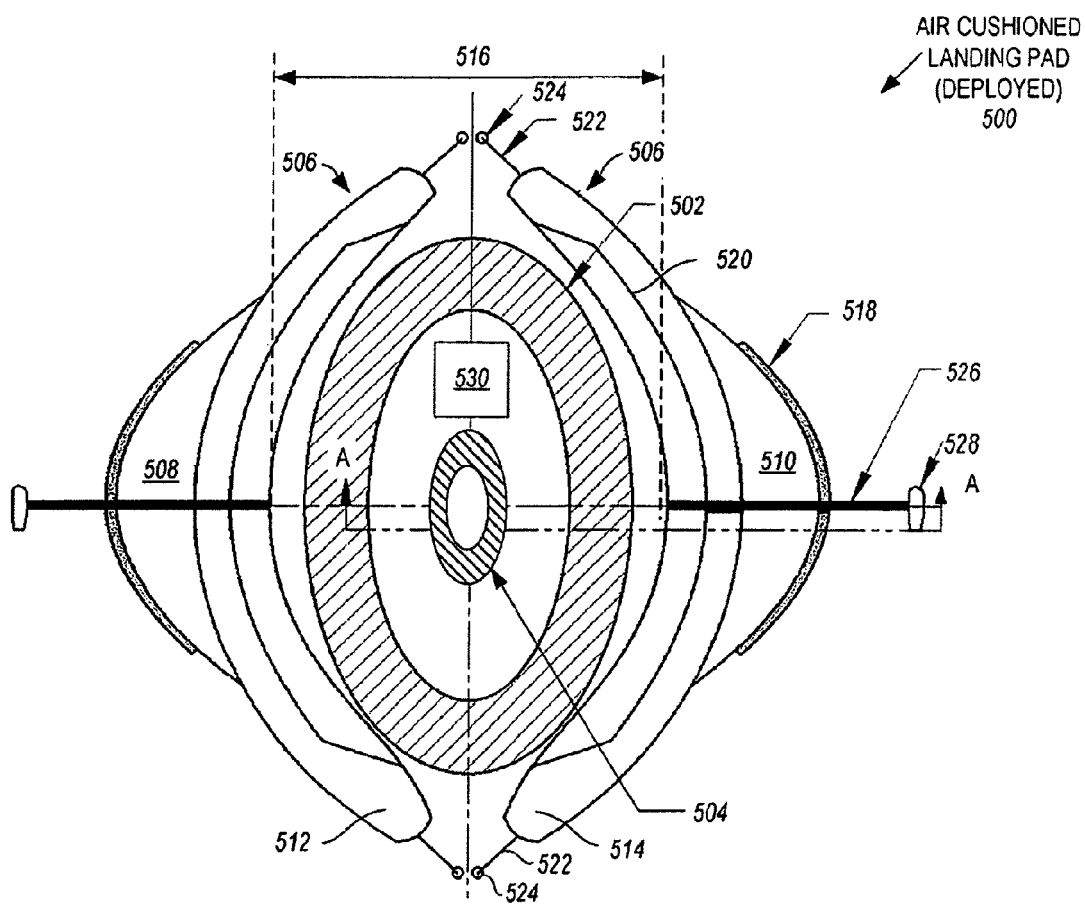
FIGS. 5A, 5B, 5C, 5D and 5E show various views of an air cushioned landing pad (ACLP) in open and closed configuration.
Figure 5B:
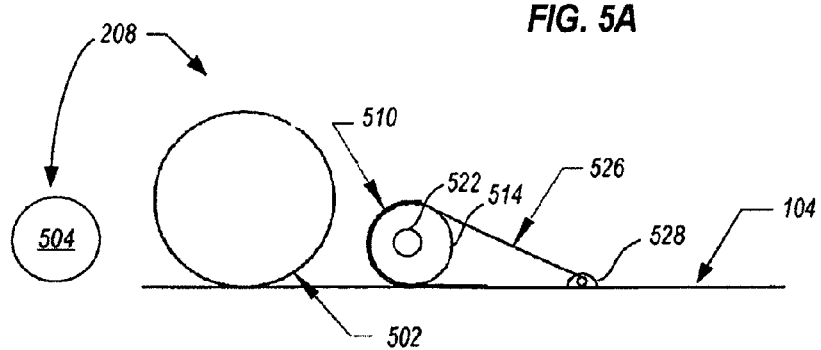
Figure 5C:
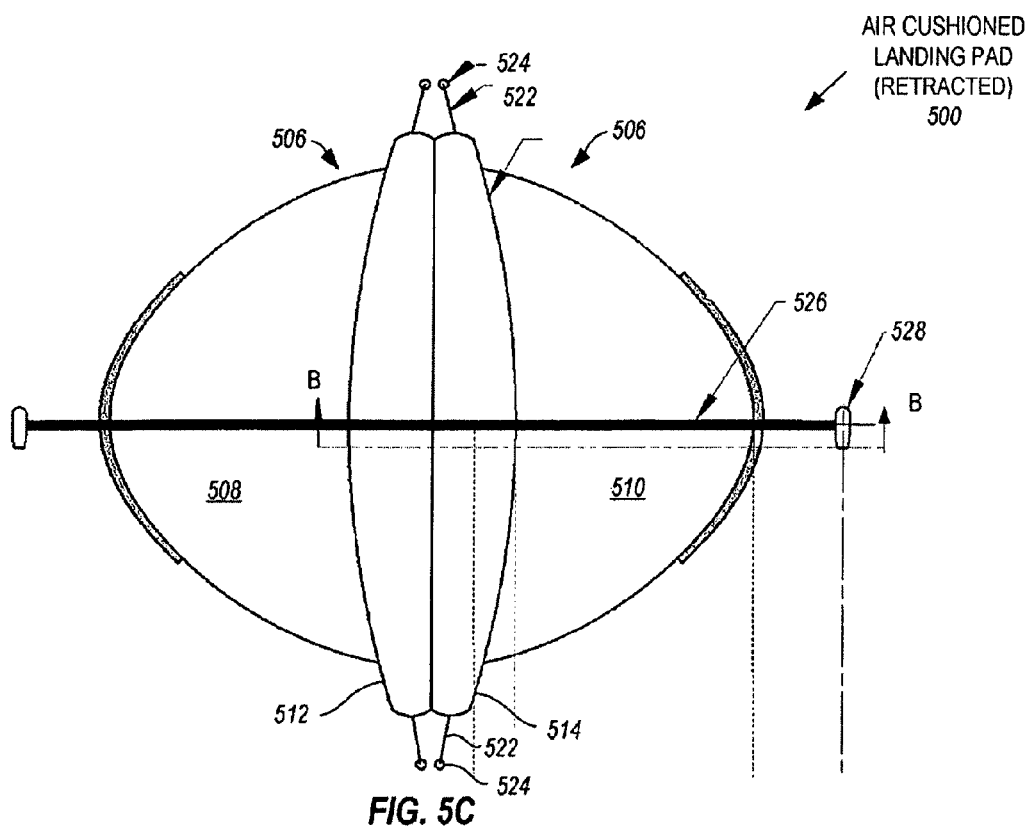
Figure 5D:
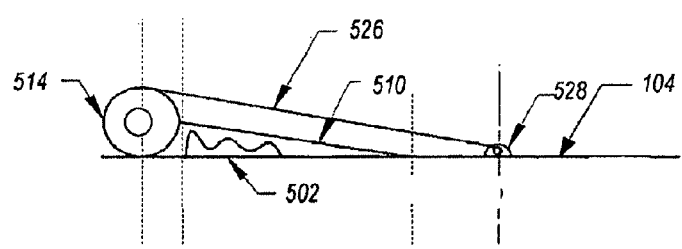

Referring to FIGS. 5A, 5B, 5C, and 5D, FIG. 5A illustrates a bottom view of an air cushioned landing pad (ACLP) 500 in a deployed (or exposed) configuration, according to some embodiments. FIG. 5B illustrates a cross sectional view (along A-A) of an air cushioned landing pad (ACLP) 500 in a deployed (or exposed) configuration, according to some embodiments. FIG. 5C illustrates a bottom view of an air cushioned landing pad (ACLP) 500 in a retracted (or covered) configuration, according to some embodiments. FIG. 5D illustrates a cross sectional view (along B-B) of an air cushioned landing pad (ACLP) 500 in a retracted (or covered) configuration, according to some embodiments.

In the embodiment depicted in FIG. 5A, the ACLP 500 includes a first bag skirt 502 extendable along a portion of the side hull 104 of the air vehicle 100. Although the first bag skirt 502 is depicted to have an elliptical shape, other shapes including circular are also contemplated. The first bag skirt 502 can be secured to the side hull 104 and is inflatable to provide an air cushion during touchdown. Bag skirt 502 is deflatable during flight of the air vehicle 100. In the depicted embodiment, the ACLP 500 also includes a second bag skirt 504 that is secured to the side hull 104 and is extendable in a volume enclosed by the first bag skirt 502. First and second bag skirts 502 and 504 may be inflated and deflated separately and individually. It is understood that the use of the second bag skirt 504 can be optional.

In some embodiments, the first bag skirt 502 and the second bag skirt 504 may include a plurality of fingers 208 (FIG. 2). Fingers 208 may be separated from one another, thereby allowing them to pass over objects such as tree stumps, rocks, and other terrain. Fingers 208 form an air chamber or air cushion, which may be individually or collectively inflated or deflated for improved control. In some embodiments, the first bag skirt 502 and the second bag skirt 504 share a common center. It is understood that the position, size, and the shape of the first bag skirt 502 and the second bag skirt 504 may be different depending on the application.

The second bag skirt 504 can be inflated prior to touchdown to provide a first air cushion between the first bag skirt 502 and the second bag skirt 504 and a second air cushion in a volume enclosed by the second bag skirt 504. Similar to the first bag skirt 502, the second bag skirt 504 can be deflated to a reduced profile during the flight of the air vehicle 100. A selective portion of air cushioned landing pads 206 (FIG. 2), e.g., the second bag skirt 504, can be deflated after touchdown and before takeoff of the air vehicle 100 to provide a vacuum seal between the air vehicle 100 and a landing surface.

The ACLP 500 includes cover assemblies 506 that are operable to expose or cover the first bag skirt 502 and the second bag skirt 504. The cover assemblies 506 may be constructed from any suitable material, for example, nylon fabric, rubber, canvas and reinforced composites. The cover assemblies 506 typically conform substantially to the outer contour of the air vehicle 100 when the first bag skirt 502 and the second bag skirt 504 are covered, thereby reducing the profile and the drag compared to a profile and a drag present when the first bag skirt 502 and the second bag skirt 504 are exposed.

In some embodiments, cover assemblies 506 include a respective cover portion 508, 510; cover roller 512, 514, shaft 522, anchors 524, retention straps 526, and actuators 528. A first cover roller 512 of the first cover portion 508 and a matching second cover roller 514 of the second cover portion 510 abut to cover the first bag skirt 502 and the second bag skirt 504. The first cover roller 512 and the second cover roller 514 are separable to expose the first bag skirt 502 and the second bag skirt 504, thereby generating a separation gap 516 between rollers 512, 514. The first cover portion 508 and the second cover portion 510 can include a first edge 518 that is secured to the side hulls 104, and a second edge 520 that is secured to the periphery of the cover rollers 512, 514 and is rollable around a corresponding one of the first cover roller 512 and the second cover roller 514. Rollers 512, 514 are typically constructed of flexible material that expands lengthwise as rollers 512, 514 are drawn from closed to open positions. Rollers 512, 514 can be inflatable to provide additional flexibility. In some embodiments, covers 508,510 are semi-elliptical and rollers 512, 514 can be tapered from the central portions toward the end portions to allow covers 508, 510 to roll smoothly around the periphery of rollers 512, 514 as rollers 512, 514 are separated. Covers 508, 510 and rollers 512, 514 may have any other suitable shapes in other embodiments.

Figure 5E:
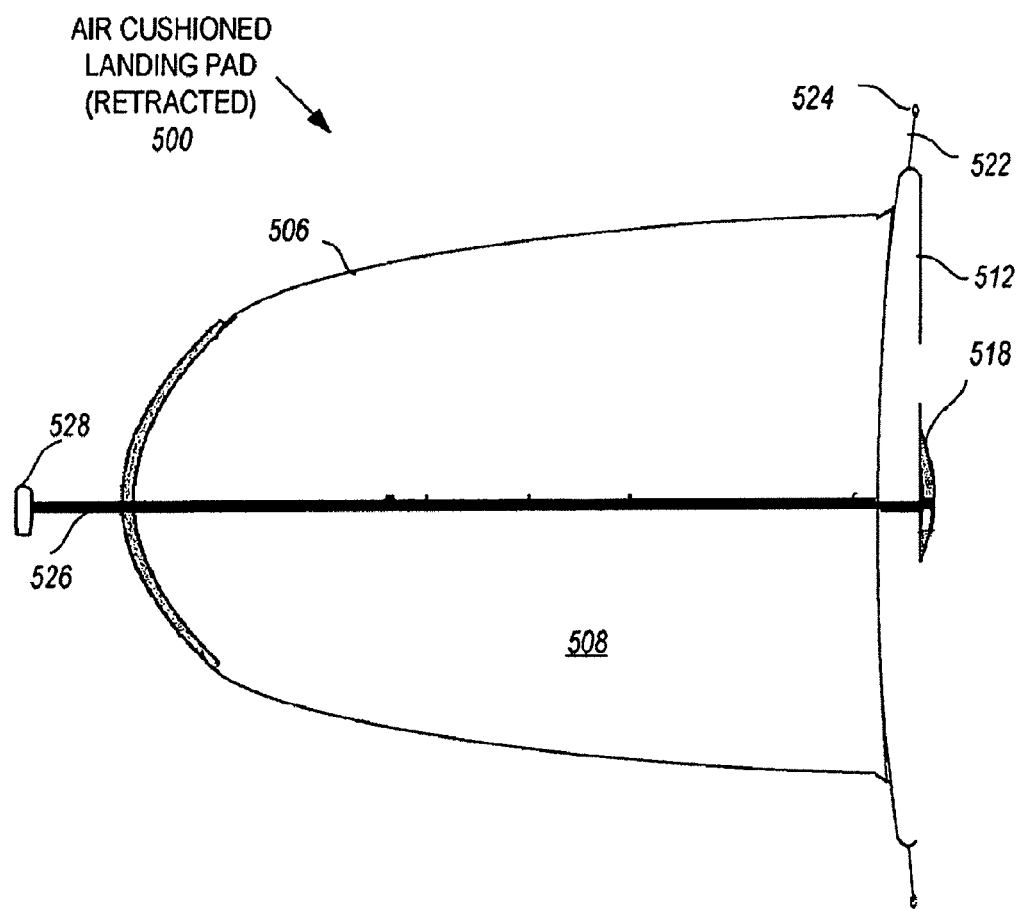

Referring to FIG. 5E, illustrates a bottom view of an air cushioned landing pad (ACLP) 500 in a retracted (or covered) configuration, according to some embodiments. In the depicted embodiment, the cover assemblies 506 may be configured to include a single cover portion, e.g., to include one of the respective cover portions 508 or 510. That is, the cover assemblies 506 may include a single cover portion 508 that can be configured to cover or uncover the first bag skirt 502 (not shown) and/or the second bag skirt 504 (not shown) without generating a separation gap. A shape of the single cover portion 508 may be configured to match a shape of the first bag skirt 502 and the second bag skirt 504 or a desired shape, e.g., elliptical, U-shaped, and similar other.

Referring to FIGS. 5A, 5B, 5C, 5D, and 5E, opposite ends of rollers 512, 514 can be coupled to a respective extensible shaft 522. In some embodiments, shafts 522 are fabricated from elastic material that stretches and retracts as rollers 512, 514 move between open and closed positions. In further embodiments, shafts 522 may be include a spring to provide the desired flexibility in length. In further embodiments, shafts 522 run through the center of rollers 512, 514 forming a core of rollers 512, 514, as shown in FIGS. 5B and 5D. Shafts 522 can be capable of being rotated or twisted along a shaft axis and each end of the shafts 522 can be pivotally coupled to the hull 104 by an anchor 524. In some embodiments, shafts 522 may be implemented as a retention strap attached to each end of rollers 512, 514 that is pivotally secured to anchor 524. The extensibility of the shafts 520 can provide additional flexibility as rollers 512, 514 move between open and closed positions. The length of shafts 522 and rollers 512, 514 vary in accordance with the distance of the separation gap 514. The length of rollers 512, 514 and shafts 522 is typically shortest in the covered position (FIG. 5C) and the longest in the exposed or open position (FIG. 5A). The extensibility of shafts 522 also enables the rollers 512, 514 to abut one another in the covered position. As described earlier, in an embodiment that includes the cover assemblies 506 being configured as a single cover portion (FIG. 5E), one of the rollers 512, along with one of the shafts 522 and corresponding anchor 524 may be shifted from the center to an edge, e.g., edge 518, of the ACLP 500. The cover assemblies 506 include a first end secured to a hull of the air vehicle and a second end securely wrapped around an extensible shaft to form the cover roller 512. One roller strap includes a first end secured to a periphery of the cover roller 512 and a second end to operate the cover assemblies 506.

Two separate roller straps 526 corresponding to respective cover portions 508, 510 are operable to move rollers 512, 514 between open and closed positions. Roller straps 526 can include a first end secured to a periphery of the respective rollers 512, 514 and a second end that is coupled to an actuator 528 that is operable to wind and unwind the straps 526 to control the separation gap 516 between rollers 512, 514. An actuator 528, such as a motor coupled to operate one or more pulleys or wenches may be used to retract and extend straps 526. A linear motion of straps 526 causes a rotational motion of the covers 508, 510 around a portion of a corresponding roller 512, 514. The linear motion also causes a rotational motion of a corresponding one of the roller straps 526 around rollers 512, 514. The roller straps 526 may be constructed from any suitable material having light weight and high tensile strength such as nylon and/or reinforced composites.

To avoid potential interference between the movements of the covers 508, 510 and the roller straps 526, the winding of the sheets 508, 510 is coordinated with the unwinding of the roller straps 526 and vice versa, thereby facilitating a smooth rolling motion of the rollers 512, 514. The circumference of rollers 512, 514 is typically selected so that covers 508, 510 do not wrap around the entire periphery of rollers 512, 514 in the open or deployed position, as shown in FIG. 5B, thereby preventing the strap 526 from being trapped under rollers 512, 514. Note that strap 526 may be attached to roller 512, 514, covers 508, 510, and/or extend around rollers 512, 514 and covers 508, 510 with one end of strap 526 being fixed and the other end of strap 526 being attached to actuator 528. In addition, the circumference of the rollers 512, 514 can be selected based on the separation gap 514 required to expose skirts 502, 504.

Referring to FIGS. 5C and 5D, one technique to close the cover assembly 506 evacuates the air from the skirts 502, 504. By simply releasing one end of strap 526, the evacuation of air causes the first cover portion 508 and the second cover portion 510 to move toward and abut one another, thereby closing the separation gap 516. The rollers 512, 514 remain separate and do not require a physical linkage such as a zipper there between to retract or deploy the ACLP 500.

In an exemplary, non-depicted embodiment, roller straps 526 may be coupled to a pulley arrangement (not shown) and pulled to increase the separation gap 516. In a particular embodiment, an increase in the separation gap 516 results in a greater portion of the covers 508, 510 being rolled around the cover rollers 512, 514 compared to the separation gap 516 being substantially equal to zero.

The separation gap 516 can have a non-linear shape, which varies from being closed to having a maximum value where the non-linear shape substantially matches a shape of the first bag skirt 502, thereby exposing it. The roller straps 526 may be released when the air evacuation system is enabled to operate the ACLP 500 is a covered mode (the separation gap 516 having a zero value) and the roller straps 526 may be retracted to separate the first cover roller 512 and the second cover roller 514 (the separation gap 516 having a maximum value), thereby exposing skirts 502, 504. Thus, the roller straps 526 may be pulled to an open position (not shown) to expose the first bag skirt 502 in preparation for landing and prior to the touchdown and released to a closed position to cover the bag skirts 502, 504 after takeoff and during the flight.

A pressurized air source 530 can be included in ACLP 500 to provide air to inflate bag skirts 502, 504, including any air cushions formed there between and including the plurality of the fingers 208 (FIG. 2). The air pressurized source 530 is operable in one of multiple modes in accordance with a flight status of the air vehicle 100. The multiple modes include a suction (or vacuum) mode to deflate the bag skirts 502, 504, a blower mode to inflate (or pressurize) the bag skirts 502, 504, and a combination mode to selectively inflate the first bag skirt 502 and deflate a second bag skirt 504 (or deflate the first bag skirt 502 and inflate a second bag skirt 504).

For takeoff and landing of the air vehicle 100, the blower mode increases the separation gap 516 to expose the skirts 502, 504. During flight, the suction mode causes the bag skirts 502, 504 to be covered by the cover assemblies 506 and have a reduced profile compared to the profile in the blower mode, thereby reducing drag on the air vehicle 100 during the flight. The combination mode, which may be selected after the touchdown and before the takeoff of the air vehicle, enables the ACLP 500 to provide distributed support and also enables the ACLP 500 to provide a vacuum seal between the air vehicle 100 and a ground surface.

The embodiments disclosed provide an ACLS for an air vehicle having an improved cover for the air cushioned landing pad to reduce drag during flight. The tools and techniques described herein provide a simple, reliable, noninterlocking type cover that is suitable for use in an aerospace environment. In particular, the cover includes a first cover portion and a second cover portion. A first cover roller of the first cover portion and a matching second cover roller of the second cover portion abut to cover the corresponding pad. The first cover roller and the second cover roller, which are separate and free from a physical linkage there between, are separable in an eyelid fashion to expose the corresponding pad. A separation gap between the first cover roller and the second cover roller is increased or decreased by at least one strap to cover or expose the corresponding pad. Additionally, the ACLS is operable in a combination mode in which the pad is used for distributed support and is also used to provide a vacuum seal between the air vehicle and a ground surface upon touchdown.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Additionally, although a strap controlled cover mechanism has been disclosed in various embodiments, other suitable non-interlocking type covering systems can be used in addition to, or instead of, a strap controlled cover. As another example, for smaller sized air vehicles, a single cover may be configured to cover the first bag skirt instead of having a cover with a first cover portion and a second cover portion. Variations and modifications of the embodiments disclosed herein may also be made while remaining within the scope of the following claims. The functionality and combinations of functionality of the individual modules can be any appropriate functionality. Additionally, limitations set forth in publications incorporated by reference herein are not intended to limit the scope of the claims. In the claims, unless otherwise indicated the article "a" is to refer to "one or more than one".

We claim:

1. An air vehicle comprising:
a bag skirt extendable along a portion of a hull of the air vehicle, the bag skirt being inflatable to provide an air cushion during touchdown and deflatable during flight of the air vehicle;
a cover roller adjacent the bag skirt; and
a cover portion coupled to the cover roller, the cover roller being configured to roll between an exposed position and an unexposed position to expose or hide the bag skirt with the cover portion without generating a separation gap,
wherein the cover roller includes an extensible shaft and a pad securely wrapped around the extensible shaft, the extensible shaft capable of being rotated along a shaft axis, one end of the extensible shaft being pivotally coupled to the hull by an anchor, a circumference of the cover roller being based on a function of a distance between the exposed and the unexposed positions, and
wherein the cover portion has a first end secured to the hull and a second end rollable around the cover roller.

2. The air vehicle of claim 1, wherein an increase in the distance between the exposed and unexposed positions results in a greater portion of the cover portion being rolled around the cover roller compared to the distance between the exposed and unexposed positions being substantially equal to zero.

3. The air vehicle of claim 1, wherein the cover portion conforms to the outer contour of the air vehicle when the bag skirt hidden, thereby reducing drag compared to a drag present when the bag skirt is exposed.

4. The air vehicle of claim 1, wherein evacuation of air from the bag skirt causes the cover portion to retract, thereby decreasing the distance between the exposed and unexposed positions.

5. The air vehicle of claim 1, further comprising a pressurized air source to provide air, the pressurized air source being operable in a suction mode to deflate the bag skirt, the pressurized air source being operable in a blower mode to inflate the bag skirt, and the pressurized air source being operable in a combination mode to inflate the bag skirt and deflate a second bag skirt, the second bag skirt being extendable in a volume enclosed by the bag skirt.

6. The air vehicle of claim 5, wherein the blower mode causes the distance to be increased for takeoff and landing of the air vehicle.

7. The air vehicle of claim 5, wherein the suction mode causes the bag skirt to have a reduced profile compared to the profile in the blower mode.

8. The air vehicle of claim 5, wherein the pressurized air source is selectable to operate in one of the blower mode for takeoff and landing of the air vehicle, the suction mode during the flight of the air vehicle, and the combination mode after the touchdown and before the takeoff of the air vehicle.

9. The air vehicle of claim 5, wherein the suction mode causes the distance to be substantially reduced to zero after a takeoff and during the flight of the air vehicle, the distance being increased to expose the bag skirt in preparation of the touchdown and after completion of the takeoff of the air vehicle.

* * * * *